(12) United States Patent
Marczynski

(10) Patent No.: US 7,891,923 B2
(45) Date of Patent: Feb. 22, 2011

(54) LOCKING DEVICE TO PREVENT LOOSENING OF TWO SCREW ACTION CONNECTIONS

(75) Inventor: Michael Marczynski, Kirkby Lonsdale (GB)

(73) Assignee: Business Lines Limited, Kirkby Lonsdale, Cumbria (GB)

( * ) Notice: Subject to any disclaimer, the term of this patent is extended or adjusted under 35 U.S.C. 154(b) by 328 days.

(21) Appl. No.: 12/226,674

(22) PCT Filed: Mar. 1, 2007

(86) PCT No.: PCT/GB2007/000714

§ 371 (c)(1),
(2), (4) Date: Oct. 24, 2008

(87) PCT Pub. No.: WO2007/122367

PCT Pub. Date: Nov. 1, 2007

(65) Prior Publication Data

US 2009/0116928 A1    May 7, 2009

(30) Foreign Application Priority Data

Apr. 25, 2006    (GB)    ................................ 0608136.8

(51) Int. Cl.
*F16B 39/20* (2006.01)
(52) U.S. Cl. .......................... 411/102; 411/87; 411/121
(58) Field of Classification Search .................... 411/87, 411/90, 92, 97, 102, 121, 981, 982, 250–252, 411/530, 517

See application file for complete search history.

(56) References Cited

U.S. PATENT DOCUMENTS

| 518,641   | A | * | 4/1894 | Baynes   | 411/88  |
|-----------|---|---|--------|----------|---------|
| D25,915   | S | * | 8/1896 | Bernard  | D8/399  |
| 581,215   | A | * | 4/1897 | Lombas   | 411/87  |
| 642,718   | A | * | 2/1900 | De Redon | 411/198 |
| 1,172,722 | A | * | 2/1916 | Millard  | 411/251 |
| 1,544,627 | A | * | 7/1925 | Bateman  | 411/87  |
| 1,815,095 | A | * | 7/1931 | Brandt   | 411/88  |
| 4,657,457 | A | * | 4/1987 | Rickwood | 411/93  |
| 5,207,543 | A | * | 5/1993 | Kirma    | 411/121 |

FOREIGN PATENT DOCUMENTS

GB    225149    11/1924
GB    2 132 301    7/1984

* cited by examiner

*Primary Examiner*—Flemming Saether
(74) *Attorney, Agent, or Firm*—Dennison, Schultz & MacDonald

(57) ABSTRACT

A metal wire is configured to provide a diagonal interconnecting part extending tangentially between first and second coils which are sized to fit around respective screw action connectors. First and second wire end portions extend tangentially from the respective first and second coils across and beyond the diagonal interconnecting part to provide first and second finger grip limbs. The first limb extends across the interconnecting part adjacent the first coil and the second limb extends across the interconnecting part adjacent the second coil so that end regions of the limbs are spaced apart and at opposite sides of the interconnecting part and are capable of being pressed towards each other in a direction transverse to the interconnecting part by the fingers of one hand in order to loosen the respective coils to enable their location over, or removal from, the respective screw action connectors.

4 Claims, 1 Drawing Sheet

LOCKING DEVICE TO PREVENT LOOSENING OF TWO SCREW ACTION CONNECTIONS

Figure 1:
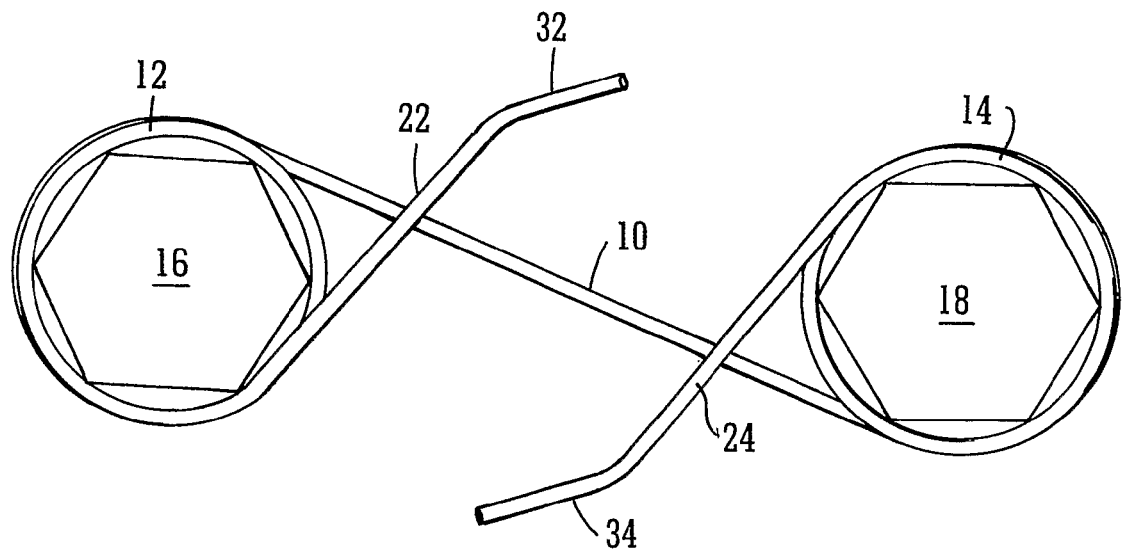

This application is a 371 of PCT/GB2007/000714 filed on Mar. 1, 2007.

The present invention concerns a locking device in the form of a clip to prevent loosening of two spaced apart screw action connectors, such as adjacent vehicle wheel nuts or adjacent nuts on railway fish plates. However, such a device is also usable on spaced apart nuts or heads of bolts in any other location.

As long ago as 1924 GB 225149 disclosed a locking device in the form of a wire clip for this purpose. It comprised a metal wire configured to provide a diagonal interconnecting part extending tangentially between first and second coils which are sized to fit around the respective nuts. The wire was crimped in the respective coil sections so that these could fit in form locking manner around angular edges of the respective nuts. Opposite ends of the wire were turned at an angle to extend outwards from the general plane of each coil to provide finger grips. It is believed that both hands of a user would be required to fit (or remove) such a device.

GB 2132301 also discloses a metal wire locking clip for the same purpose and of the same general configuration, in that a diagonal interconnecting part extends tangentially between first and second coils which are sized to fit around the respective screw action connectors. However, in this proposal first and second end portions of the wire extend tangentially from the respective first and second coils to provide first and second finger grip limbs. In a commercially available embodiment of this device these limbs extend across and beyond the diagonal interconnecting part. The first limb extends across the interconnecting part at a location adjacent the second coil, while the second limb extends across the interconnecting part at a location adjacent the first coil. Accordingly, in order to place the clip over a pair of wheel nuts it is first necessary to move the limbs away and apart from each other in order to open up the coils and increase their internal diameter sufficiently to fit over the corners of the wheel nuts. Once so-fitted, the limbs need to be pressed towards each other and otherwise manipulated so that hook portions formed at their respective ends engage over the other limb in each case in order to ensure adequate tension in the coils to grip around the respective nuts.

The fitting of the aforesaid locking clip to adjacent wheel nuts (and its removal) is difficult to accomplish, requires use of both hands and also considerable manual strength and dexterity on the part of the user.

An object of the present invention is to provide a metal wire locking clip which is easier to fit (or remove) than the prior art devices while maintaining adequate tension of the coils around the respective nuts in use.

According to the present invention a locking device to prevent loosening of two spaced apart screw action connectors comprises a metal wire configured to provide a diagonal interconnecting part extending tangentially between first and second coils, which are sized to fit around the respective screw action connectors, and first and second end portions which extend tangentially from the respective first and second coils across and beyond the diagonal interconnecting part to provide first and second finger grip limbs, but this device is characterised in that the first limb extends across the interconnecting part adjacent the first coil and the second limb extends across the interconnecting part adjacent the second coil so that end regions of the limbs are spaced apart and at opposite sides of the interconnecting part and are capable of being pressed towards each other in a direction transverse to the interconnecting part by the fingers of one hand, in order to loosen the respective coils to enable their location over, or removal from, the respective screw action connectors.

Figure 2:
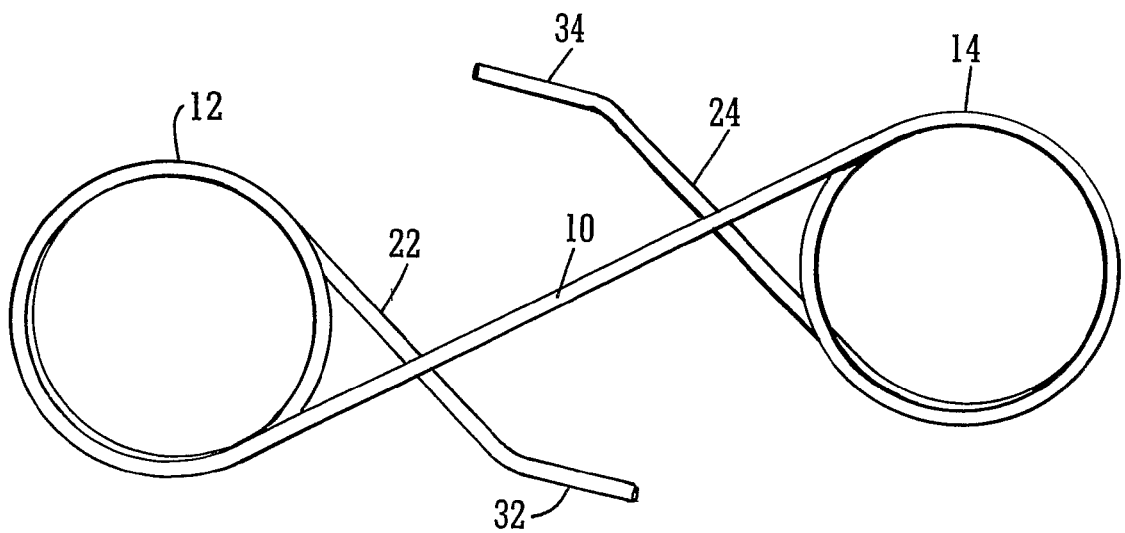

The invention will now be described further, by way of example, with reference to the accompanying drawings, in which:

FIG. 1 is a plan view of a practical embodiment of the locking device of the invention showing how it would fit over adjacent nuts; and FIG. 2 is a similar view of the same device from the rear.

As illustrated, this practical embodiment of the invention comprises a locking clip made from spring steel wire of round cross-section, although square or any other cross-section would be possible. It is preferably of stainless steel to minimise corrosion.

The clip has a diagonal interconnecting part 10 extending tangentially between a first coil 12 and a second coil 14. Each of these coils, 12, 14 are of almost three complete helical turns. As viewed in FIG. 1, they are each coiled in an anticlockwise direction extending from the diagonal part 10 and above the plane of the diagonal part 10. Respective end portions of the wire extend tangentially from the coils 12, 14 as limbs 22, 24. These limbs 22, 24 extend across and beyond the diagonal part 10 as viewed in FIG. 1.

The limb 22 leading from the first coil 12 extends directly across the diagonal part 10 adjacent said first coil 12, while the limb 24 leading from the second coil 14 extends directly across the diagonal part 10 adjacent the second coil 14.

End regions of these limbs 22, 24 are bent to form finger grips 32, 34 which lie at a convenient spacing apart at opposite sides of the diagonal part 10 and in a generally parallel disposition. These finger grips 32, 34 can readily be pressed towards each other by the fingers of one hand thereby to open up slightly both of the respective coils 12, 14. In use, this squeezing together of the finger grips 32, 34 enables the device to be easily placed onto adjacent nuts or other screw connectors. Obviously the diameter and spacing of the coils 12, 14 is selected to correspond to the particular screw connectors on which the device is to be used.

In FIG. 1 the device is shown placed onto adjacent standard wheel nuts 16, 18 which have been tightened in a clockwise direction. As the finger grips 32, 34 are released the coils 12, 14 close tightly around the respective nuts 16, 18. This prevents the nuts 16, 18 from loosening as any anticlockwise rotation of either nut 16, 18 is effectively countered by correspondingly tightening of the relevant coil 12 or 14 in that direction owing to its frictional engagement with the nut.

To cater for nuts which are tightened in an anticlockwise direction, the device can be applied to them the opposite way up, in the orientation shown in FIG. 2, where the limbs 22, 24 extend across the diagonal part 10 at a spacing below said part. The finger grips 32, 34 can be squeezed together in just the same way in this reverse orientation.

The foregoing is not limitative and variations in detail are possible in other embodiments. For example, the coil sections of the wire could be crimped. However, that is not essential and the device can operate satisfactorily without such crimping, as in the illustrated embodiment. Also, the number of turns in each coil may differ in other embodiments.

The invention claimed is:

1. A locking device to prevent loosening of two spaced apart screw action connectors, said device comprising a metal wire configured to provide a diagonal interconnecting part extending tangentially between first and second coils, which are sized to fit around the respective screw action connectors, and first and second end portions which extend tangentially from the respective first and second coils across and beyond the diagonal interconnecting part to provide first and second finger grip limbs, wherein the first limb extends across the interconnecting part adjacent the first coil and the second limb extends across the interconnecting part adjacent the second coil so that end regions of the limbs are spaced apart and at opposite sides of the interconnecting part and are capable of being pressed towards each other in a direction transverse to the interconnecting part by the fingers of one hand in order to loosen the respective coils to enable their location over, or removal from, the respective screw action connectors.

2. A locking device according to claim 1 wherein the end regions of the respective limbs are bent to define opposing finger grip regions.

3. A locking device according to claim 2 wherein the opposing bent finger grip regions extend substantially parallel to each other at opposite sides of the interconnecting part.

4. A locking device according to claim 1 wherein each coil comprises three turns of wire.

\* \* \* \* \*